United States Patent
Tinsman

(10) Patent No.: US 10,044,873 B2
(45) Date of Patent: Aug. 7, 2018

(54) MUTE ALERT

(71) Applicant: OpenTV, Inc., San Francisco, CA (US)

(72) Inventor: John Tinsman, Fallbrook, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 15/237,419

(22) Filed: Aug. 15, 2016

(65) Prior Publication Data

US 2018/0048767 A1 Feb. 15, 2018

(51) Int. Cl.
| | |
|---|---|
| *H04M 3/56* | (2006.01) |
| *H04M 7/00* | (2006.01) |
| *H04L 12/26* | (2006.01) |
| *H04L 29/06* | (2006.01) |
| *H04M 3/42* | (2006.01) |

(52) U.S. Cl.
CPC ............ *H04M 3/566* (2013.01); *H04L 43/16* (2013.01); *H04L 65/403* (2013.01); *H04M 3/42374* (2013.01); *H04M 7/006* (2013.01)

(58) Field of Classification Search
CPC ......... H04M 1/72519; H04M 2207/18; H04M 2250/62; H04M 3/56; H04W 4/06; H04N 7/15; H04N 7/155; H04N 7/157; H04N 1/42; A47B 2200/0079; G05B 2219/33298; G05D 2201/0211; G06F 19/3425; H04L 29/06027; H04L 29/06414
USPC ....................................................... 455/416
See application file for complete search history.

(56) References Cited

U.S. PATENT DOCUMENTS

| | | | |
|---|---|---|---|
| 8,593,501 B1* | 11/2013 | Kjeldaas ................. | H04N 7/15 348/14.01 |
| 8,867,721 B2 | 10/2014 | Hanson et al. | |
| 2003/0185371 A1 | 10/2003 | Dobler | |
| 2004/0239615 A1 | 12/2004 | Firebaugh et al. | |
| 2005/0018862 A1 | 1/2005 | Fisher | |
| 2007/0071206 A1 | 3/2007 | Gainsboro et al. | |
| 2008/0160976 A1* | 7/2008 | Virolainen ............ | H04M 3/568 455/416 |
| 2009/0022305 A1* | 1/2009 | Chavez ............... | H04M 1/6008 379/388.03 |

(Continued)

FOREIGN PATENT DOCUMENTS

WO WO-2018035106 A1 2/2018

OTHER PUBLICATIONS

"International Application Serial No. PCT/US2017/046913, International Search Report dated Nov. 6, 2017", 2 pgs.

(Continued)

*Primary Examiner* — Sharad Rampuria
(74) *Attorney, Agent, or Firm* — Schwegman Lundberg & Woessner, P.A.

(57) ABSTRACT

Example embodiments provide a system and method for dynamically providing a mute alert on a communication device. The system receives an audio signal during a communication session. Using one or more hardware processors of the system, the audio signal is analyzed to detect speech. The system determines whether the detected speech transgresses a predetermined threshold. In response to determining that the communication device is in a mute mode and the detected speech transgresses the predetermined threshold, the system provides an alert, via the communication device, notifying the user that the communication device is in the mute mode.

21 Claims, 8 Drawing Sheets

(56) References Cited

U.S. PATENT DOCUMENTS

| | | | |
|---|---|---|---|
| 2010/0067680 A1* | 3/2010 | Hanson | H04M 3/4285 379/202.01 |
| 2010/0260332 A1* | 10/2010 | Brown | H04M 9/08 379/421 |
| 2013/0051543 A1* | 2/2013 | McDysan | H04M 3/4286 379/202.01 |
| 2015/0085064 A1* | 3/2015 | Sanaullah | H04M 3/568 348/14.08 |
| 2015/0334497 A1 | 11/2015 | Vanblon et al. | |
| 2016/0255204 A1* | 9/2016 | Vashisht | H04M 7/0078 370/260 |

OTHER PUBLICATIONS

"International Application Serial No. PCT/US2017/046913, Written Opinion dated Nov. 6, 2017", 8 pgs.

* cited by examiner

MUTE ALERT

FIELD

The present disclosure generally relates to machines configured to the technical field of special-purpose machines that facilitate providing a mute alert including computerized variants of such special-purpose machines and improvements to such variants, and to the technologies by which such special-purpose machines become improved compared to other special-purpose machines that provide a mute alert.

BACKGROUND

While on a phone or VoIP conference call, one or more participants typically mute their microphone when the participant is not speaking. It frequently happens that the participant on mute forgets that they are muted. When this participant starts talking, other parties to the call cannot hear them and may even assume the participant is no longer on the call.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) facilitate providing a mute alert to a user, and example systems (e.g., special-purpose machines) are configured to facilitate providing the mute alert to the user. In particular, example embodiments provide mechanisms and logic that monitor a sensor (e.g., microphone) of a communication device for an audio signal during a communication session, and analyze the audio signal for intentional speech (e.g., speech that is intended to be heard by other participants on a call). Accordingly, the mechanisms and logic detect speech from the audio signal. The mechanisms and logic then determine whether the detected speech transgresses a predetermined threshold. In response to the communication device being in the mute mode and the detected speech transgressing the predetermined threshold, the mechanisms and logic provide an alert, subject to preferences, to the user. Because the user may not have intended to speak on the call (e.g., the user was talking to someone else in the room), the user has an option to unmute the communication device only when they intend to speak on the call. As a result, one or more of the methodologies described herein facilitate solving the technical problem of providing a mute alert during a communication session.

Figure 1:
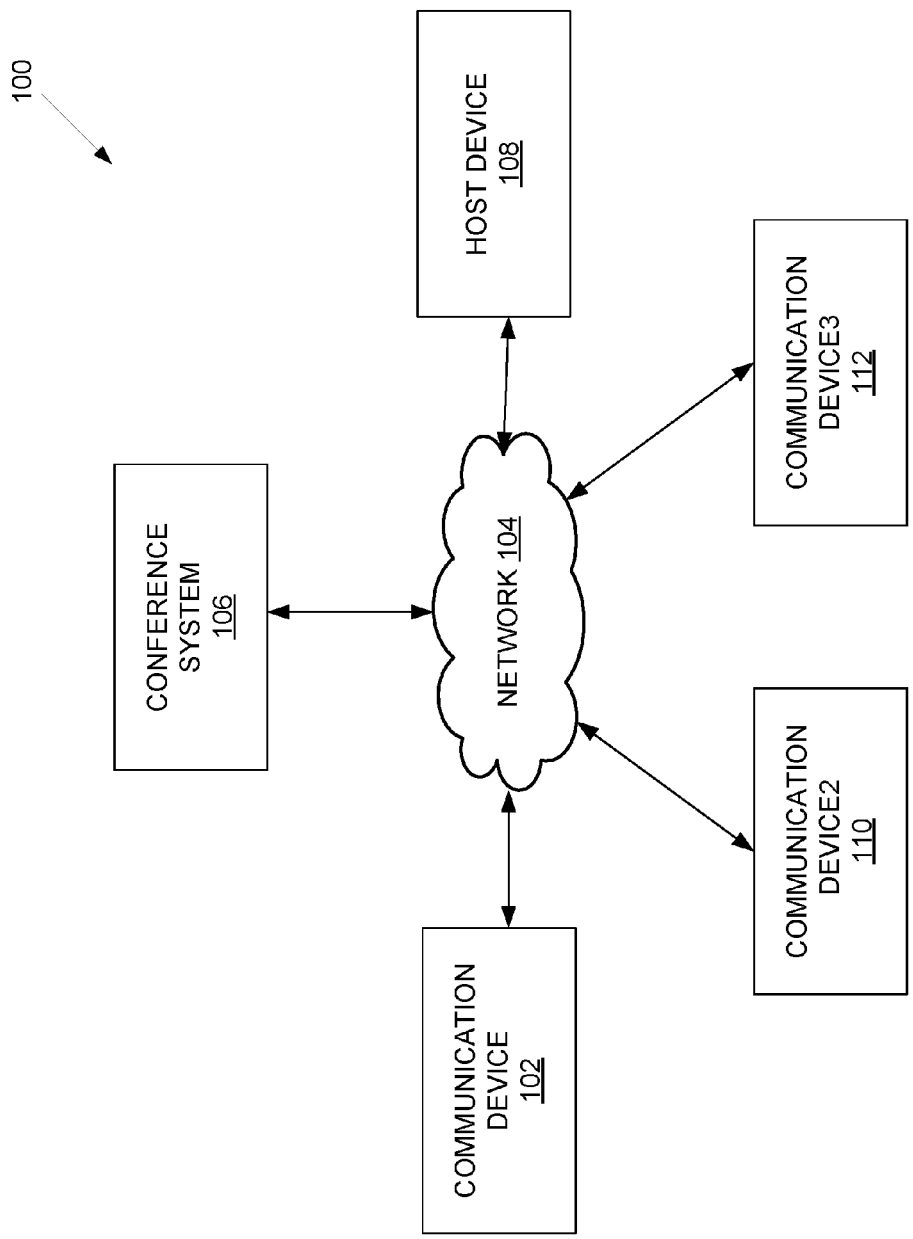
FIG. 1 is a diagram illustrating an example environment for providing a mute alert in accordance with an example embodiment.

With reference to FIG. 1, a diagram illustrating an example environment 100 comprising a system for dynamically providing a mute alert is shown. In example embodiments, a user participates on a call with one or more other users via a communication device 102 that is communicatively coupled via a network 104 to a conference system 106. During a communication session, the communication device 102 may be muted and a mute detection analysis performed. The communication device 102 may comprise, but is not limited to, a smartphone, tablet, laptop, multi-processor system, microprocessor-based or programmable consumer electronics, game console, set-top box, or any other device that the user may utilize to communicate over the network 104. In some embodiments, the communication device 102 may comprise a display module (not shown) to display information (e.g., in the form of user interfaces). In further embodiments, the communication device 102 may comprise one or more of a touch screen, camera, keyboard, and microphone.

One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 104 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The conference system 106 manages a communication session (also referred to as a "conference call" or "call") between the user at the communication device 102 and a second user (also referred to as the "host") at a host device 108. In example embodiments, the second user at the host device 108 is responsible for organizing and managing the communication session. In some embodiments, the user at the communication device 102 may be the host. In these embodiments, the communication device 102 is the host device 108.

Further still, other users (at communication device2 110 and communication device3 112) may be coupled via the network 104 to the conference system 106 in order to participate in the conference call. Similar to the communication device 102, the communication device2 110, the communication device3 112, as well as the host device 108 may comprise, but are not limited to, a smartphone, tablet, laptop, multi-processor system, microprocessor-based or programmable consumer electronics, game console, set-top box, or any other device that a user may utilize to communicate. Furthermore, the communication device2 110, the communication device3 112, and the host device 108 may comprise a display module (not shown) to display information (e.g., in the form of user interfaces) along with one or more of a touch screen, camera, and microphone.

While a total of four users or participants are shown in the conference call illustrated in FIG. 1, any number of users may be involved in the conference call. Additionally, functionalities of the communication device 102, discussed below, may be present in one or more of the host device 108, the communication device2 110, or the communication device3 112.

It is noted that the environment 100 shown in FIG. 1 is merely an example. For instance, not all components of the environment 100 may be shown. Additionally, any two or more of the systems, devices, or machines illustrated in FIG. 1 may be combined into a single system, device, or machine, and the functions described herein for any single system or machine may be subdivided among multiple systems or machines. For example, the user of the communication device 102 may be the host of the conference call, thus making the communication device 102 the host device 108. Furthermore, operations discussed as occurring at the communication device 102 may be performed at the conference system 106. For example, one or more of the communication devices may be muted by the conference system 106 (e.g., user at the host device 108 transmits instructions to the conference system 106 to mute certain communications devices). In another example, some or all of the mute detection analysis discussed below as being performed at the communication device 102 may be performed at the conference system 106.

Any of the systems or machines (e.g., devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
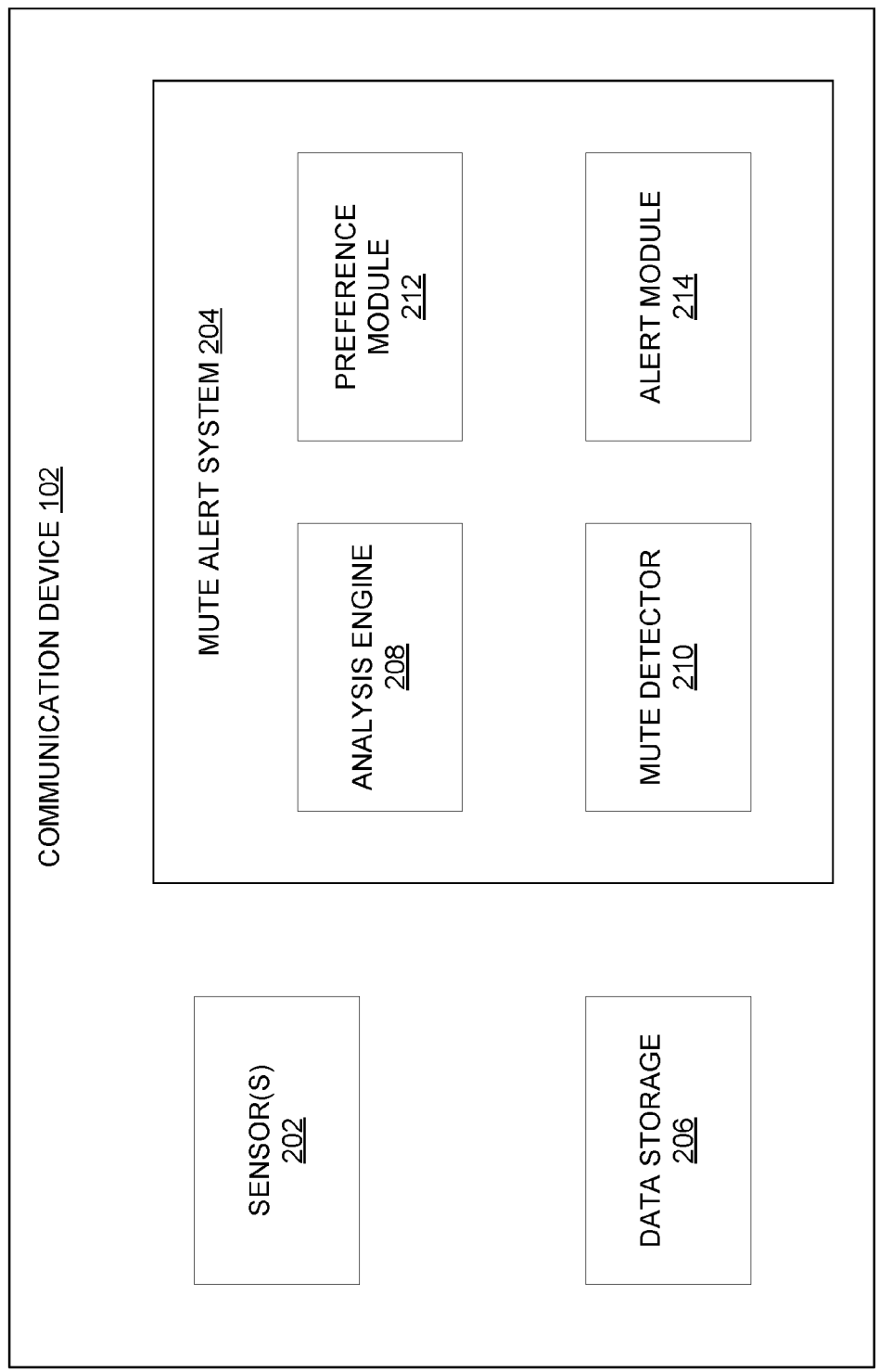
FIG. 2 is a block diagram illustrating an example embodiment of a communication device.

FIG. 2 is a block diagram illustrating an example embodiment of the communication device 102. The communication device 102 is configured to perform a mute detection analysis that includes monitoring for an audio signal that may contain speech. The audio signal is then analyzed to detect any speech. If detected speech in the audio signal transgresses one or more predetermined thresholds and the communication device 102 is in a mute mode, a mute alert is provided subject to user preferences. To enable these operations, the communication device 102 comprises one or more sensors 202, a mute alert system 204, and a data storage 206, all of which are configured to communicate with each other (e.g., over a bus, shared memory, or a switch).

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. For example, some of the components may be embodied within the communication device 102 while others are embodied within the conference system 106. The communication device 102 may comprise other components not pertinent to example embodiments that are not shown or discussed.

In example embodiments, the sensor(s) 202 comprises one or more microphones in the communication device 102 that captures audio signals. In accordance with some embodiments, the sensor(s) 202 may be positioned in different directions on the communication device 102. For example, a first sensor 202 is located on a front of the communication device 102, while a second sensor 202 is located on a back of the communication device 102. Joint examination of the audio received by the sensors 202 provides an indication from which direction an audio signal is coming. The mute alert system 204 may use this directional information in determining whether the audio signal contains intentional speech as will be discussed in more detail below. In example embodiments, the sensor(s) 202 monitor for audio signals regardless of whether the communication device 102 is in a mute mode.

The mute alert system 204 manages determination of whether to dynamically provide a mute alert. The mute alert system 204 receives the audio signal from the sensor(s) 202 and analyzes the audio signal to determine whether the audio signal contains speech, determine a corresponding voice signature, and determine whether the detected speech transgresses one or more predetermined thresholds that would indicate that the detected speech is intentional speech. If the detected speech transgresses the one or predetermined thresholds and the communication device 102 is in a mute mode, an alert is provided to the user. In order to perform these operations, the mute alert system 204 comprises an analysis engine 208, a mute detector 210, a preference module 212, and an alert module 214 all communicatively coupled together.

The analysis engine 208 is configured to perform the analysis on the audio signal to determine whether the audio signal contains speech and to determine one or more voice signatures from the speech. The analysis engine 208 will be discussed in more detail in connection with FIG. 3.

The mute detector 210 is configured to determine whether the communication device 102 is in the mute mode. For example, the mute detector 210 may be communicatively coupled to a mute selector (e.g., a mute button), and receive a signal or notification each time the mute selector is selected or deselected. The mute detector 210 provides notification to the alert module 214 as to the state or status of the communication device 102 (e.g., in the mute mode, in an unmute mode).

The preference module 212 manages preferences for providing alerts to the user. In example embodiments, the preference module 212 causes a user interface to be presented on the communication device 102 on which the user indicates types of alerts, levels of alerts, and alert tiers to be provided. The type of alerts include, for example, visual alerts (e.g., pop-up dialog or user interface, flashing light, text), audible alerts (e.g., beep, tone, ring), and tactile alerts (e.g., buzz, vibrate). As such, the user can select one or more types of alerts to be used to notify the user that they are in the mute mode during a call. In some embodiments, if the user does not set up certain preferences, one or more default alerts will automatically be used.

The preference module 212 also allows the user, via the user interface, to establish different levels of alerts based on a detected speaker. In one embodiment, detection of a non-habitual speaker (e.g., a speaker whose voice signature is not known to the mute alert system 204, not set as belonging to a habitual user, or not previously detected a threshold number of times) may trigger an alert that is different than an alert that is provided based on a voice signature belonging to a habitual user (e.g., a speaker whose voice signature is known to the mute alert system 204 or set as belonging to the habitual user). For example, the alert provided in response to detection of the non-habitual speaker may be a visual alert, while the alert provided in response to detection of the habitual speaker may comprise a visual alert along with an audible alert or tactile alert.

The user may also establish multi-tiered alerts whereby if a first tier alert is ignored after a predetermined period of time, a second tier alert is provided. For example, a first tier alert may comprise a visual alert. If the first tier alert is not acknowledged within a predetermine amount of time (e.g., 15 seconds), for example, by the user selecting an unmute option (e.g., unmute button) or selecting an option to ignore the alert (e.g., selecting an "ignore alert" button), the alert module 214 escalates to a second tier alert that may comprise the visual alert in addition to a tactile alert. Any number of tiers of alerts and types of alerts within those tiers may be established by the user or set as default.

The various preferences established using the preference module 212 are stored to the data storage 206. In response to detection of the detected speech transgressing a corresponding threshold (e.g., for a habitual user or non-habitual user) and detection that the communication device 102 is in the mute mode, the alert module 214 provides an appropriate alert. Accordingly, the alert module 214 accesses the data storage 206 to determine the alert preferences (or default alerts) to provide to the user. In example embodiments, the alert module 214 causes a signal to be provided to a corresponding one or more transducers or other components to create the appropriate alert. For example, the signal may be provided to a speaker to provide an audio alert, to a motor to cause the communication device to vibrate, or a display unit to display the alert.

The alert module 214 also monitors for acknowledgement of the alert. If the user does not acknowledge the alert after a predetermined period of time, the alert module 214 provides a next tier alert, subject to preferences or default settings, and continues to provide escalating tier alerts until, for example, acknowledgement is received or the user stops talking.

Figure 3:
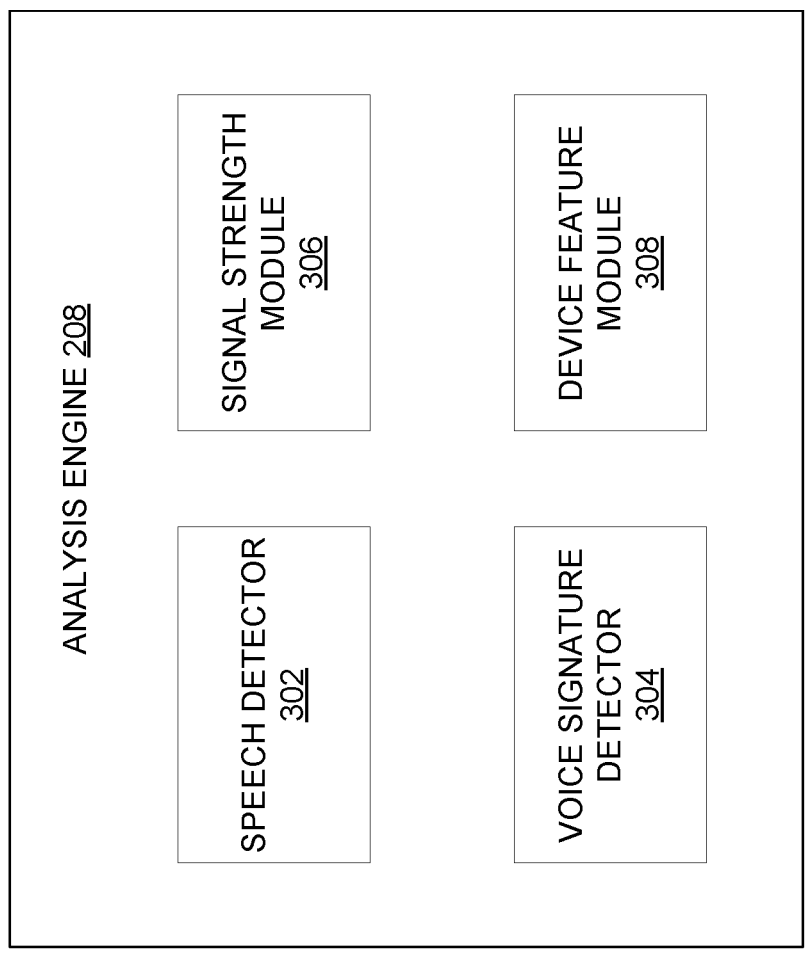
FIG. 3 is a block diagram illustrating an example embodiment of an analysis engine.

FIG. 3 is a block diagram illustrating an example embodiment of the analysis engine 208. The analysis engine 208 performs the analysis on the audio signal to determine whether the audio signal contains speech and to determine one or more voice signatures from the detected speech. In some embodiments, the analysis engine 208 also determines a speech-to-noise ratio. In order to perform these operations, the analysis engine 208 comprises a speech detector 302, a voice signature detector 304, a signal strength module 306, and a device feature module 308 all communicatively coupled together.

The speech detector 302 analyzes the audio signal captured by the sensor(s) 202. In example embodiments, the speech detector 302 performs signal processing on the audio signal to detect spectral signatures likely to be human speech. In some example embodiments, the speech detector 302 performs the signal processing on the audio signal over a few seconds to detect the spectral signatures. In one example, the speech detector 302 detects human speech based on pitch within a speech range found in the audio signal. The speech detector 302 may also separate human speech from background noise. In one example signal processing process, the speech detector 302 may first perform noise reduction on the audio signal (e.g., via spectral subtraction). Next, features or quantities (e.g., spectral/speech values) are calculated from a section of the audio signal. These may include one or more of spectral periodicity, spectral analysis relative to typical human speech, or residual analysis when the incoming audio is processed by a speech encoder. Subsequently, the section is classified by the speech detector 302 as speech or non-speech (e.g., based on whether a speech threshold is transgressed by the spectral/speech values).

The voice signature detector 304 determines whether speech detected by the speech detector 302 corresponds to a known voice signature that is gathered over time or since a start of the communication session. Alternatively, the known voice signature is pre-established with the mute alert system 204 (e.g., a frequent user of the communication device 102 provides a sample of their voice and instructs the mute alert system 204 to establish him as a habitual user as part of a preference setting). Accordingly, in some embodiments, the known voice signature is a voice signature of a habitual user of the communication device 102, such as an owner of the communication device 102.

In embodiments where the detected speech does not correspond to a known voice signature of a habitual user of the communication device 102, the voice signature detector 304 may store the voice signature (e.g., in the data storage 206 or cache) and note that it belongs to a non-habitual user. Subsequently, if the same voice signature is detected a threshold number of times further (e.g., in the same communication session, over several communication sessions), the voice signature of the non-habitual user may be converted to a voice signature of a new habitual user by the voice signature detector 304.

The signal strength module 306 detects a strength of the detected speech. In one embodiment, the signal strength module 306 detects a volume of the detected speech. A higher volume indicates that the user is closer to the sensor(s) 202, which is an indication that the detected speech is more likely intentional speech. As such, the volume detected by the signal strength module 306 is provided to the alert module 214, which determines whether the volume of the detected speech transgresses a volume threshold that would indicate that the detected speech is likely intentional speech, in accordance with some embodiments.

The signal strength module 306 also calculates a strength of the detected speech relative to a total sound level from the audio signal to discriminate between detected speech (e.g., based on spectral signatures or pitch) and background noise. In example embodiments, the signal strength module 306 calculates a signal-to-noise indication. The signal-to-noise indication (or indicator) is provided to the user of the communication device 102 or the host device 108. The user at the host device 108 can use this information to detect a source of background noise on the conference call (e.g., which user of a plurality of user is in a noisy environment). For instance, if the user of the host device 108 receives the signal-to-noise indication which indicates that the communication device 102 is in a noisy environment, the user of the host device 108 can notify the user of the communication device 102 to move to a quieter location. In example embodiments, the signal strength module 306 performs the signal-to-noise analysis regardless of whether the communication device 102 is in the mute mode.

The device feature module 308 manages other information that may indicate whether detected speech is intentional speech. In some embodiments, the device feature module 308 considers orientation of the communication device 102 and a direction from which the audio signal is received. For example, if the communication device 102 is being held in a vertical orientation (e.g., a user is holding the communication device 102 up to their ear), and the audio signal is detected coming from the second sensor 202 located on the back of the communication device 102, the mute alert system 204 (e.g., the device feature module 308) may determine that any speech in the audio signal is not intentional speech since it is not coming from a direction (e.g., from the first sensor 202 on the front of the communication device 102) from which a user holding the communication device 102 in their hand would speak.

In another example, if the orientation of the communication device 102 indicates that the communication device 102 is lying flat on a surface, then the device feature module 308 concludes that the communication device 102 is being used in a capacity of a speaker phone. The device feature module 308 may provide this information to the signal strength module 306 or the alert module 214, which can then, for example, adjust a volume threshold (e.g., to a lower volume threshold) since the communication device 102 is not being held next to a speaker's mouth.

The device feature module 308 also detects whether the communication device 102 is in a headset mode. In the headset mode, only a voice signature of an owner of the communication device 102 or a habitual user will be considered to indicate intentional speech, according to example embodiments.

As such, types of voice signatures detected, a strength of the detected speech, and features of the communication device 102 are used by the mute alert system 204 to determine whether detected speech is intentional speech and whether to provide the mute alert to the user. In example embodiments, the alert module 214 makes this determination, in part, based on preferences established using the preference module 212 and stored in the data storage 206.

Figure 4:
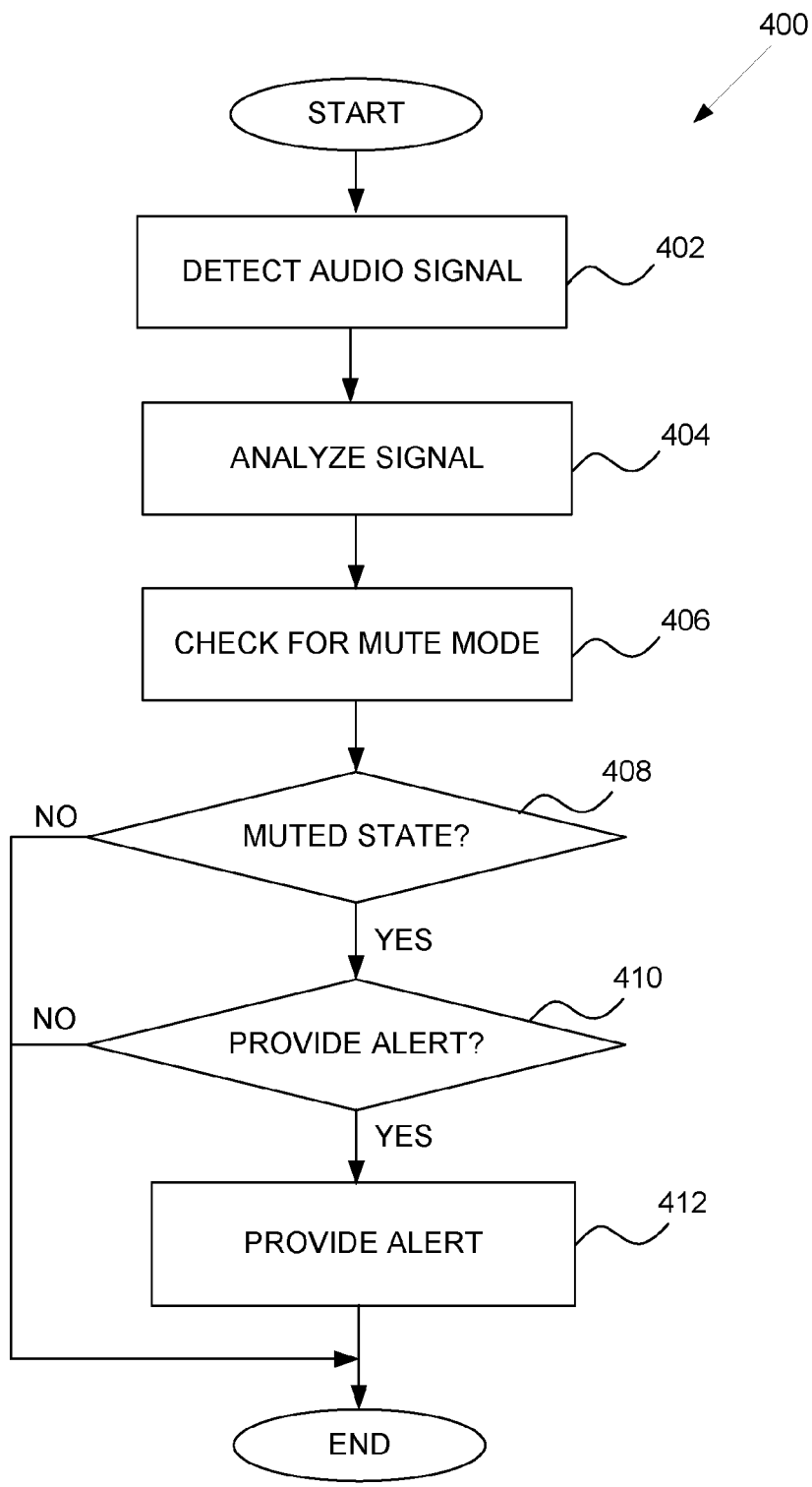
FIG. 4 is a flow diagram of an example method for providing a mute alert.

FIG. 4 is a flow diagram of an example method 400 for dynamically providing a mute alert. In example embodiments, the method 400 is performed in part or in whole by components of the communication device 102. Accordingly, the method 400 is described by way of example with reference to the communication device 102. However, it shall be appreciated that at least some of the operations of the method 400 may be deployed on various other hardware configurations or be performed by similar components residing elsewhere in the environment 100. Therefore, the method 400 is not intended to be limited to the communication device 102.

In operation 402, an audio signal is detected. In example embodiments, one or more sensors 202 (e.g., microphones) of the communication device 102 detects the audio signal. In some embodiments, the sensor(s) 202 may be positioned in different locations on the communication device 102 providing an indication from which direction the audio signal is received. The audio signal is then provided (e.g., transmitted) to the mute alert system 204.

In operation 404, the audio signal is analyzed to determine whether the audio signal contains speech and whether the detected speech corresponds to a voice signature of a habitual user or a non-habitual user. Accordingly, the analysis determines whether the detected speech is intentional speech. Operation 404 will be discussed in more detail in connection with FIG. 5.

In operation 406, the mute alert system 204 checks whether the communication device 102 is in a mute mode. In example embodiments, the mute detector 210 is communicatively coupled to a mute selector (e.g., a mute button), and receives a signal or notification each time the mute selector is selected or deselected. Thus, the mute detector 210 maintains a mute status for the communication device 102. If, in operation 408, the communication device 102 is not in mute mode, the method 400 ends.

However, if the communication device 102 is in the mute mode, then a determination as to whether to provide the alert is performed in operation 410. If conditions are not met to trigger provisioning of the alert, then the method 400 ends. Alternatively, if the conditions are met to trigger the provisioning of the alert, then the alert is provided in operation 412. Operations 410 and 412 will be discussed in more detail in connection with FIG. 6.

Figure 5:
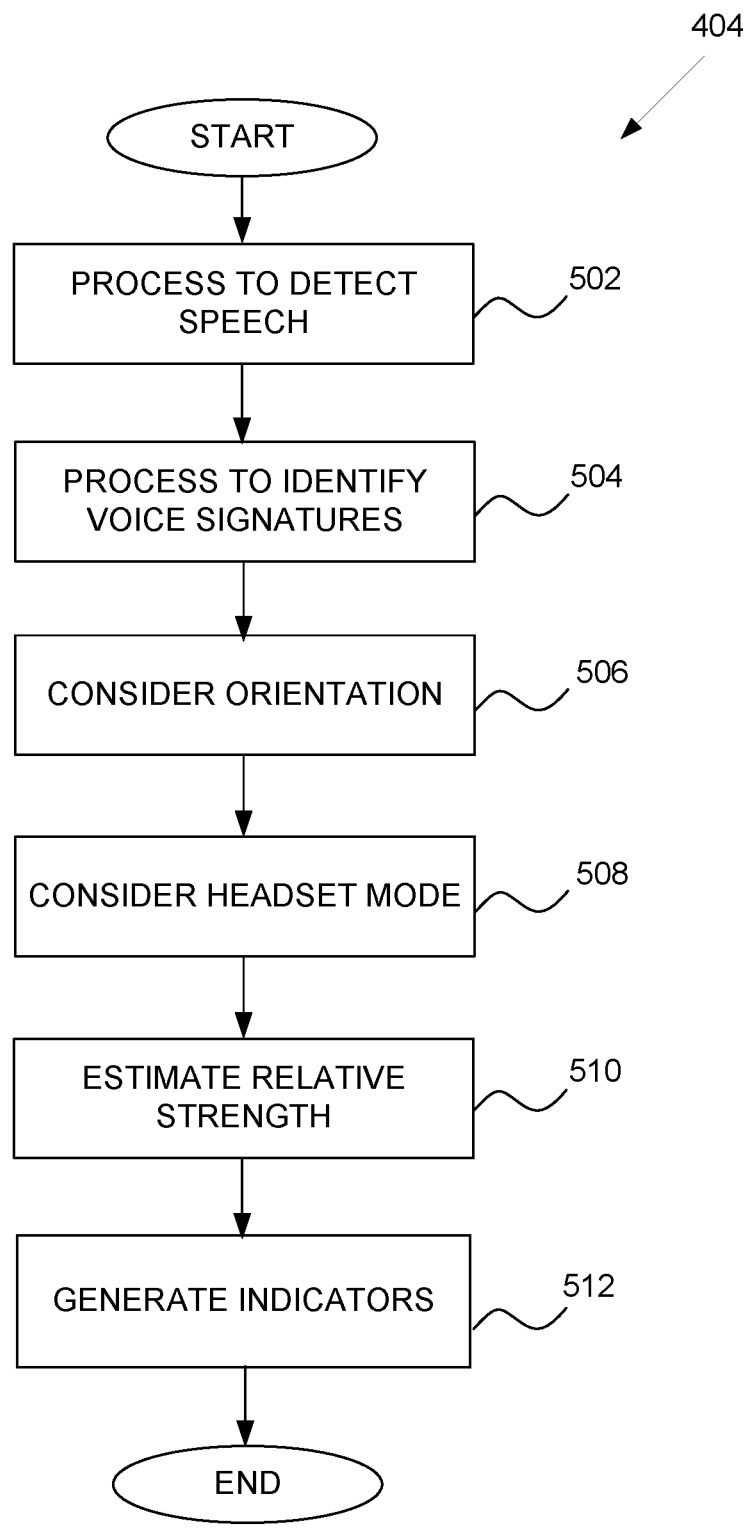
FIG. 5 is a flow diagram of an example method for analyzing an audio signal.

FIG. 5 is a flow diagram of an example method (e.g., operation 404) for analyzing the audio signal. In some embodiments, the method is performed in part or in whole by components of the analysis engine 208 which can be embodied either in whole or part in the mute alert system 204 of the communication device 102. Accordingly, the method is described by way of example with reference to the analysis engine 208. However, it shall be appreciated that at least some of the operations of the method may be deployed on various other hardware configurations or be performed by similar components residing elsewhere in the environment 100. Therefore, the method is not intended to be limited to the analysis engine 208.

In operation 502, the audio signal is processed to detect whether it contains speech. In example embodiments, the speech detector 302 processes the audio signal to detect spectral signatures likely to be human speech. In one example, the speech detector 302 detects human speech based on pitch within a speech range found in the audio signal. The speech detector 302 may also separate human speech from background noise.

In operations 504, the speech is processed to identify a voice signature. In example embodiments, the voice signature detector 304 determines whether speech detected by the speech detector 302 corresponds to a known voice signature that is gathered over time, a known voice signature since a start of the communication session, or a known voice signature previously established by a frequent user of the communication device 102 (e.g., as part of a preference setting). Accordingly, the voice signature detector 304 compares the speech detected by the speech detector 302 to known voice signatures (e.g., stored in the data storage 206). If the speech matches a known voice signature, then the speech belongs to a habitual user. If the speech does not match a known voice signature, then the speech belongs to a non-habitual user of the communication device 102.

In operation 506, the mute alert system 204 considers an orientation of the communication device 102. In example embodiments, the device feature module 308 considers the orientation of the communication device 102 and a direction from which the audio signal is received. For example, if the communication device 102 is being held in a vertical orientation (e.g., a user is holding the communication device 102 up to their ear), and the audio signal is detected coming from the second sensor 202 located on the back of the communication device 102, the device feature module 308 may determine that any speech in the audio signal is not intentional speech since it is not coming from a direction (e.g., from the first sensor 202 on the front of the communication device 102) from which a user holding the communication device 102 in their hand would speak. In another example, if the orientation of the communication device 102 indicates that the communication device 102 is lying flat on a surface and that the communication device 102 is in a speaker mode, then the device feature module 308 will conclude that the communication device 102 is being used in a capacity of a speaker phone. The device feature module 308 may provide this information to the signal strength module 306 or the alert module 214. The signal strength module 306 or the alert module 214 can then, for example, adjust a volume threshold (e.g., to a lower volume threshold) since the communication device 102 is not being held next to a speaker's mouth.

In operation 508, the mute alert system 204 considers whether the communication device 102 is in a headset mode. In example embodiments, the device feature module 308 detects whether the communication device 102 is in a headset mode. In the headset mode, only a voice signature of an owner of the communication device 102 or a habitual user will be considered to indicate intentional speech, according to example embodiments.

In operation 510, a relative strength of the detected speech is estimated. In example embodiments, the signal strength module 306 detects the strength of the detected speech (e.g., volume). The signal strength module 306 also calculates a strength of the detected speech relative to a total sound level from the audio signal to discriminate between speech and background noise. In example embodiments, the signal strength module 306 calculates a signal-to-noise indication. In operation 512, signal-to-noise indicators are generated by the signal strength module 306. The signal-to-noise indicator may then be provided to the user of the communication device 102 or the host device 108.

Figure 6:
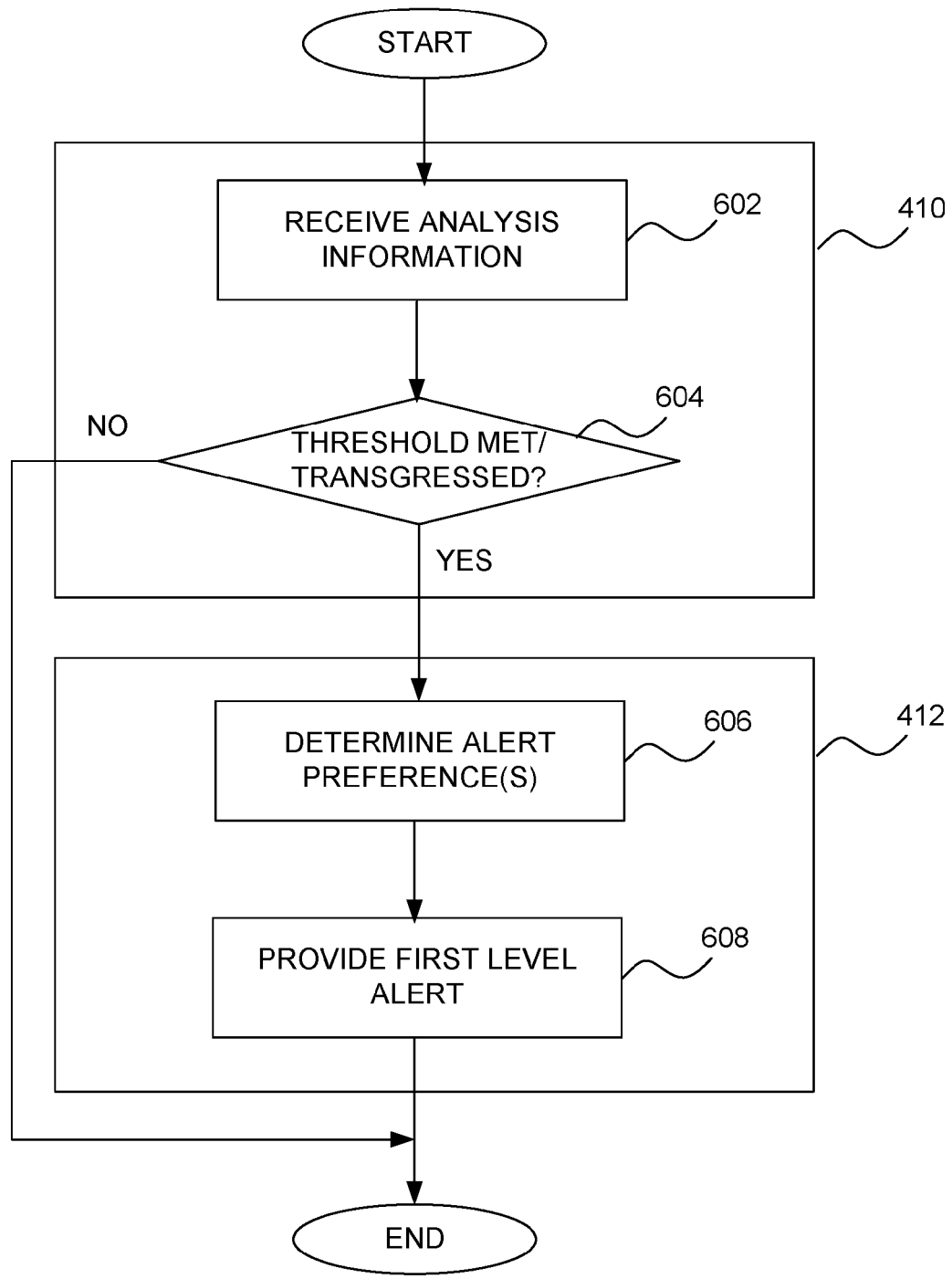
FIG. 6 is a flow diagram of an example method for determining whether to provide the mute alert.

FIG. 6 is a flow diagram of an example method (e.g., operations 410 and 412) for determining whether to provide the mute alert and the type of alert to provide. In some embodiments, the method is performed in part or in whole by the alert module 214, which can be embodied either in whole or part in the communication device 102. Accordingly, the method is described by way of example with reference to the alert module 214. However, it shall be appreciated that at least some of the operations of the method may be deployed on various other hardware configurations or be performed by similar components residing elsewhere in the environment 100. Therefore, the method is not intended to be limited to the alert module 214.

Operations 602 and 604 are performed as part of operation 410 in which a determination as to whether to provide the alert is made. In operation 602, the alert module 214 receives one or more of the following indications from the analysis engine 208: whether the voice signature belongs to a habitual user or a non-habitual user, whether the communication device 102 is in a headset mode or conference mode, or an orientation of the communication device 102.

In operation 604, a determination is made as to whether the detected speech transgresses a predetermined threshold. In some embodiments, the predetermined threshold may differ based on whether the voice signature belongs to a habitual user or a non-habitual user. Therefore, the alert module 214 identifies from the indication whether the voice signature belongs to a habitual user or a non-habitual user. Using that information, the alert module 214 can determine, for example, if a level (e.g., volume) of the detected speech transgresses a predetermined threshold (e.g., a predetermined volume threshold stored in the data storage 206 and accessed by the alert module 214 to perform the determination) for the specific type of user (e.g., habitual user or non-habitual user). If the level transgresses the predetermined threshold, the detected speech is likely intentional speech, in accordance with some embodiments.

Further still, if the communication device 102 is in a headset mode, only a voice signature of an owner of the communication device 102 or a habitual user will be considered to indicate intentional speech, according to example embodiments. Therefore, if the indication indicates that the voice signature belongs to a non-habitual user, then the detected speech is determined not to be intentional speech (e.g., not meeting or transgressing the predetermined threshold in operation 604). Conversely, if the communication device 102 is in the headset mode and the voice signature belongs to a habitual user or known user, a level of the detected speech may then be compared to the predetermined threshold (e.g., volume threshold) to determine whether the predetermined threshold is transgressed.

With respect to the orientation, if the orientation of the communication device 102 indicates that the communication device 102 is lying flat on a surface, then the device feature module 308 concludes that the communication device 102 is being used in a capacity of a speaker phone, and the signal strength module 306 or the alert module 214 adjusts the predetermined threshold (e.g., to a lower volume threshold) or selects a predetermined lower threshold since the communication device 102 is not being held next to a speaker's mouth. The alert module 214 compares the detected speech to the lower threshold in operation 604.

If the threshold is met or transgressed in operation 604, then operation 412 is performed. Operation 412 may comprise operations 606 and 608. In operation 606, one or more alert preferences is determined (e.g., by accessing the data storage 206). In example embodiments, the alert preferences are established by a user of the communication device 102 or otherwise are default preferences. The preferences include types of alerts (e.g., visual alerts, audible alerts, and tactile alerts). The preferences may also include different levels of alerts based on the identified user. In one embodiment, detection of a non-habitual speaker (e.g., a speaker whose voice signature is not known to the mute alert system 204, not set as belonging to a habitual user, or not previously detected a threshold number of times) may trigger an alert that is different that an alert that is provided based on a voice signature belonging to a habitual user (e.g., a speaker whose voice signature is known to the mute alert system 204 or set as belonging to the habitual user). For example, the alert provided in response to detection of the non-habitual speaker may be a visual alert, while the alert provided in response to detection of the habitual speaker comprises a visual alert along with an audible alert or tactile alert.

Based on the preferences, a first level alert is provided in operation 608. In example embodiments, the alert module 214 causes a signal to be provided to a corresponding one or more transducers or other components to create the first level alert. For example, the signal may be provided to a speaker to provide an audio alert, to a motor to cause the communication device to vibrate, or a display unit to display the first level alert.

Figure 7:
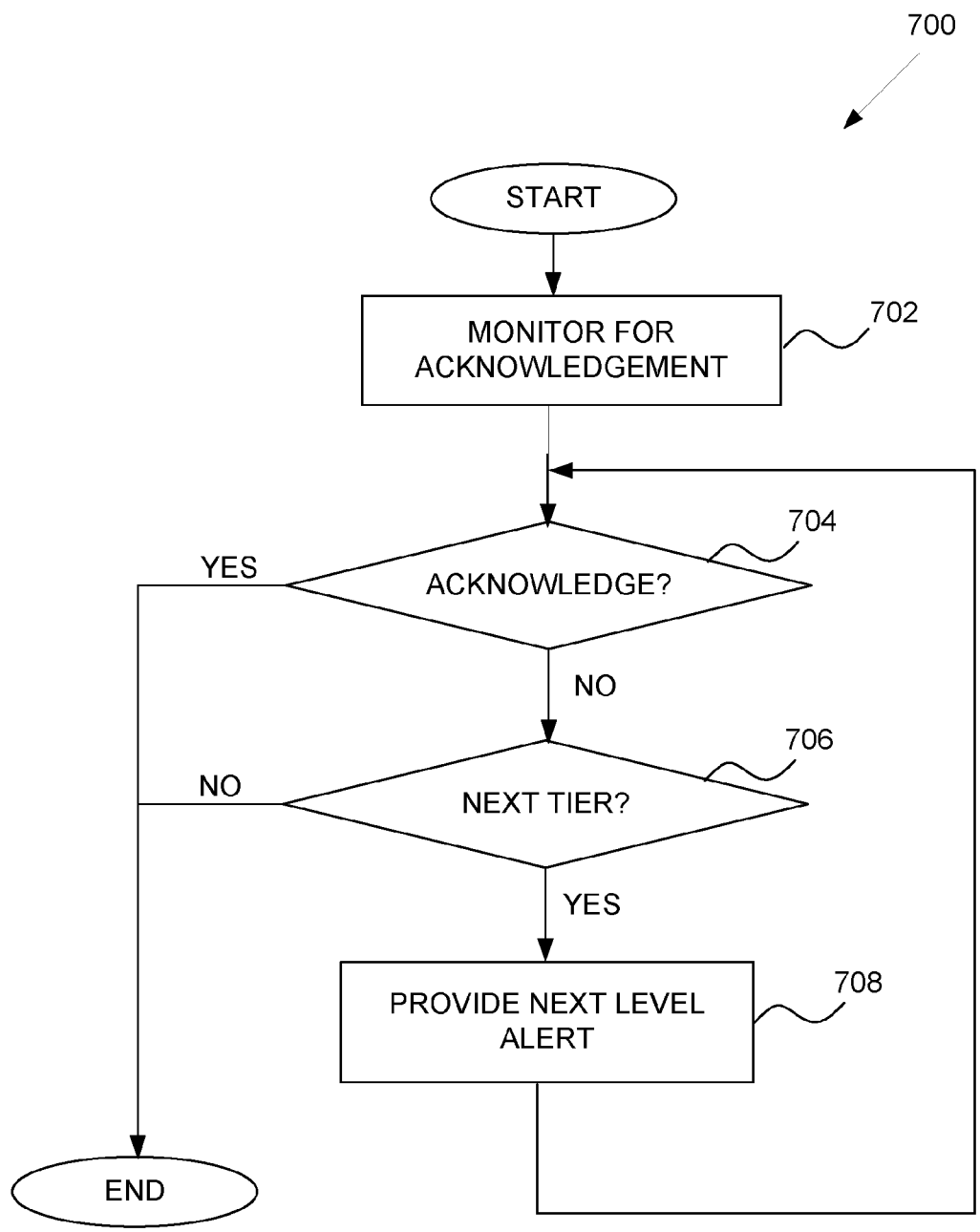
FIG. 7 is a flow diagram of an example method for determining whether to escalate the mute alert.

FIG. 7 is a flow diagram of an example method 700 for determining whether to escalate the mute alert. In some embodiments, the method 700 is performed in part or in whole by the alert module 214, which can be embodied either in whole or part in the communication device 102. Accordingly, the method 700 is described by way of example with reference to the alert module 214. However, it shall be appreciated that at least some of the operations of the method 700 may be deployed on various other hardware configurations or be performed by similar components residing elsewhere in the environment 100. Therefore, the method is not intended to be limited to the alert module 214.

In operation 702, the alert module 214 monitors for acknowledgement of the alert (e.g., the first tier alert). The acknowledgement may comprise the user indicating that they received the alert (e.g., selecting an option displayed on a user interface indicating the acknowledgement) or the user unmuting the communication device 102.

In operation 704, a determination is made as to whether the user acknowledges the alert. If the user acknowledges the alert, the method 700 ends. However, if the user does not acknowledge the alert after a predetermined period of time, a determination is made as to whether there is a next tier alert established (e.g., stored as a preference) in operation 706. If there is not a next tier alert, the alert module 214 may continue to provide the same alert, provide the same alert periodically, or stop providing the alert. If there is a next tier alert set as a preference, the alert module 214 provides the next tier alert in operation 708, and continues to provide escalating tier alerts until acknowledgement is received or a highest tier alert is provided.

Figure 8:
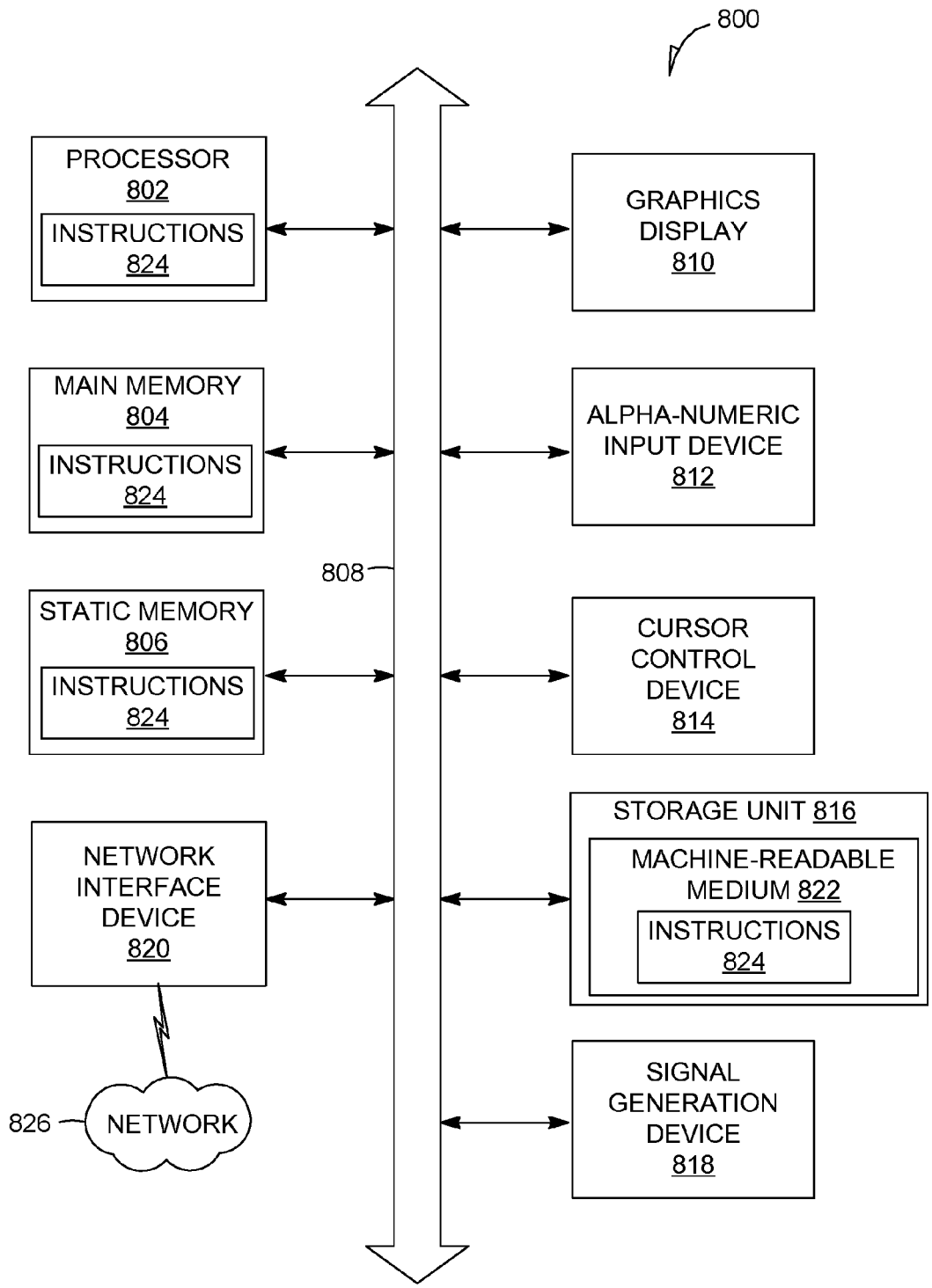
FIG. 8 is a diagrammatic representation of a machine in an example form of a computing system within which a set of instructions may be executed for causing the machine to perform any one or more of the methodologies discussed herein, according to an example embodiment.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer device (e.g., a computer) within which the instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIGS. 4 through 7. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. The machine 800 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 800 capable of executing the instructions 824, sequentially or otherwise, that specify actions to be taken by that machine 800. Further, while only a single machine 800 is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media 822 (e.g., tangible and non-transitory machine-readable media).

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 822 able to store data temporarily or permanently and may be taken to include, but not be limited to, random-access memory (RAM), read-only memory (ROM), buffer memory, flash memory, and cache memory. While the machine-readable medium 822 is shown, in an example embodiment, to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing instructions 824 for execution by a machine (e.g., machine 800), such that the instructions 824, when executed by one or more processors of the machine 800 (e.g., processor 802), cause the machine 800 to perform any one or more of the methodologies described herein. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device."

Furthermore, the machine-readable medium 822 is non-transitory in that it does not embody a propagating or transitory signal. However, labeling the machine-readable medium 822 as "non-transitory" should not be construed to mean that the medium is incapable of movement—the medium should be considered as being transportable from one physical location to another. Additionally, since the machine-readable medium 822 is tangible, the medium may be considered to be a machine-readable storage device.

In some example embodiments, the instructions 824 for execution by the machine 800 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 824)

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Example 1 is a method for dynamically proving a mute alert. An audio signal captured from a communication session is received at a communication device. One or more hardware processors of the communication device analyze the audio signal to detect speech. A determination is made as to whether the detected speech transgresses a predetermined threshold. A determination is also made that the communication device is in a mute mode. In response to determining that the communication device is in the mute mode and the detected speech transgresses the predetermined threshold, an alert is provided, via the communication device, notifying the user that the communication device is in the mute mode.

In example 2, the subject matter of example 1 can optionally include monitoring for acknowledgement of the alert. In response to not receiving the acknowledgement, a next tier alert is determined and provided via the communication device.

In example 3, the subject matter of examples 1-2 can optionally include accessing alert preferences and determining a type of alert to provide based on the alert preferences.

In example 4, the subject matter of examples 1-3 can optionally include wherein the type of alert to provide is based on whether a voice signature determined from the detected speech belongs to a habitual user or a non-habitual user.

In example 5, the subject matter of examples 1-4 can optionally include determining a voice signature from the detected speech, wherein the predetermined threshold is based on the voice signature.

In example 6, the subject matter of examples 1-5 can optionally include wherein the determining the voice signature comprises determining whether the voice signature belongs to a habitual user or a non-habitual user.

In example 7, the subject matter of examples 1-6 can optionally include, in response to the determining that the voice signature belongs to the non-habitual user, determining whether the voice signature for the non-habitual user has been detected a threshold number of times and, in response to the determining that the voice signature for the non-habitual user being detected the threshold number of times, converting the voice signature for the non-habitual user into a voice signature for a new habitual user and storing the voice signature for the new habitual user.

In example 8, the subject matter of examples 1-7 can optionally include estimating a relative strength of the detected speech to background noise and providing an indicator of the relative strength of the detected speech to the background noise to the user or a host of the communication session.

In example 9, the subject matter of examples 1-8 can optionally include wherein the determining whether the detected speech transgresses the predetermined threshold takes into consideration whether the communication device is in a headset mode.

In example 10, the subject matter of examples 1-9 can optionally include wherein the determining whether the detected speech transgresses the predetermined threshold takes into consideration an orientation of the communication device.

In example 11, the subject matter of examples 1-10 can optionally include wherein the providing the alert comprises providing a signal to a transducer to create the alert.

Example 12 is a machine-readable storage device storing instructions which, when executed by the at least one processor of a machine, cause the machine to perform operations. The operations comprise receiving, at a communication device of a user, an audio signal captured from a communication session, analyzing the audio signal to detect speech, determining whether the detected speech transgresses a predetermined threshold, determining that the communication device is in a mute mode, and in response to determining that the communication device is in the mute mode and the detected speech transgresses the predetermined threshold, providing an alert, via the communication device, notifying the user that the communication device is in the mute mode.

In example 13, the subject matter of claim 12 can optionally include where the operations further comprise monitoring for acknowledgement of the alert and, in response to not receiving the acknowledgement, determining a next tier alert and providing the next tier alert via the communication device.

In example 14, the subject matter of examples 12-13 can optionally include wherein the operations further comprising accessing alert preferences and determining a type of alert to provide based on the alert preferences, wherein the type of alert to provide is based on whether a voice signature determined from the detected speech belongs to a habitual user or a non-habitual user.

In example 15, the subject matter of examples 12-14 can optionally include wherein the operations further comprise determining a voice signature from the detected speech, the determining the voice signature comprises determining whether the voice signature belongs to a habitual user or a non-habitual user, wherein the predetermined threshold is based on the voice signature.

In example 16, the subject matter of examples 12-15 can optionally include wherein the operations further comprise estimating a relative strength of the detected speech to background noise and providing an indicator of the relative strength of the detected speech to the background noise to the user or a host of the communication session.

In example 17, the subject matter of examples 12-16 can optionally include wherein the providing the alert comprises providing a signal to a transducer to create the alert.

Example 18 is a system for dynamically providing a mute alert. The system includes one or more processors configured to perform operations comprising receiving, at a communication device of a user, an audio signal captured from a communication session, analyzing the audio signal to detect speech, determining whether the detected speech transgresses a predetermined threshold, determining that the communication device is in a mute mode, and in response to determining that the communication device is in the mute mode and the detected speech transgresses the predetermined threshold, providing an alert, via the communication device, notifying the user that the communication device is in the mute mode.

In example 19, the subject matter of example 18 can optionally include wherein the operations further comprise monitoring for acknowledgement of the alert and, in response to not receiving the acknowledgement, determining a next tier alert and providing the next tier alert via the communication device.

In example 20, the subject matter of examples 18-19 can optionally include wherein the operations further comprise accessing alert preferences and determining a type of alert to provide based on the alert preferences, wherein the type of alert to provide is based on whether a voice signature determined from the detected speech belongs to a habitual user or a non-habitual user.

In example 21, the subject matter of examples 18-20 can optionally include wherein the operations further comprise determining a voice signature from the detected speech, the determining the voice signature comprises determining whether the voice signature belongs to a habitual user or a non-habitual user, wherein the predetermined threshold is based on the voice signature.

In example 22, the subject matter of examples 18-21 can optionally include wherein the providing the alert comprises providing a signal to a transducer to create the alert.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 822 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, at a communication device of a user, an audio signal captured from a communication session associated with the communication device;
   analyzing, using one or more hardware processors, the audio signal to detect speech;
   determining, using one or more hardware processors, whether the detected speech transgresses a predetermined threshold;
   determining, using one or more hardware processors, that the communication device is in a mute mode;
   in response to determining that the communication device is in the mute mode and determining that the detected speech transgresses the predetermined threshold:
      comparing a signature determined in the detected speech to one or more known signatures stored in the communication device to determine whether the signature belongs to a habitual user or non-habitual user, and
      determining an alert to provide based on at least a type of alert that is determined using one or more alert preferences of the user and
      that is determined based on the comparing indicating whether the signature belongs to the habitual user or the non-habitual user; and
   providing, via the communication device, the alert determined based on the one or more alert preferences, the provided alert notifying the user that the communication device is in the mute mode.

2. The method of claim 1, further comprising:
monitoring for acknowledgement of the alert; and
in response to not receiving the acknowledgement, determining, from the one or more alert preferences, a next tier alert, and providing the next tier alert via the communication device.

3. The method of claim 1, wherein the determining the alert comprises accessing, from a data storage, the one or more alert preferences.

4. The method of claim 1, further comprising:
causing a user interface to be presented on which the user indicates the one or more alert preferences;
receiving the one or more alert preferences; and
storing the one or more alert preferences to a data storage.

5. The method of claim 1, further comprising determining the signature from the detected speech, wherein the predetermined threshold is based on the signature.

6. The method of claim 1, further comprising:
in response to the determining that the signature belongs to the non-habitual user, determining whether the signature for the non-habitual user has been detected a threshold number of times; and
in response to the determining that the signature for the non-habitual user has been detected the threshold number of times, converting the signature for the non-habitual user into a signature for a new habitual user, and storing the signature for the new habitual user.

7. The method of claim 1, further comprising:
estimating a relative strength of the detected speech to background noise; and
providing an indicator of the relative strength of the detected speech to the background noise to the user or a host of the communication session.

8. The method of claim 1, wherein the determining whether the detected speech transgresses the predetermined threshold comprises:
determining whether the communication device is in a headset mode, and
based on the communication device being in the headset mode, considering a signature of an owner of the communication device or the habitual user to indicate intentional speech.

9. The method of claim 1, wherein the determining whether the detected speech transgresses the predetermined threshold takes into consideration an orientation of the communication device.

10. The method of claim 1, wherein the providing the alert comprises providing a signal to a transducer to create the alert.

11. A machine-readable storage device storing instructions that, when executed by one or more processors of a machine, cause the machine to perform operations comprising:
receiving, at a communication device of a user, an audio signal captured from a communication session associated with the communication device;
analyzing the audio signal to detect speech;
determining whether the detected speech transgresses a predetermined threshold;
determining that the communication device is in a mute mode;
in response to determining that the communication device is in the mute mode and determining that the detected speech transgresses the predetermined threshold:
comparing a signature determined in the detected speech to one or more known signatures stored in the communication device to determine whether the signature belongs to a habitual user or non-habitual user, and
determining an alert to provide based on at least a type of alert that is determined using one or more alert preferences of the user and
that is determined based on the comparing indicating whether the signature belongs to the habitual user or the non-habitual user; and
providing, via the communication device, the alert determined based on the one or more alert preferences, the provided alert notifying the user that the communication device is in the mute mode.

12. The machine-readable storage device of claim 11, wherein the operations further comprise:
monitoring for acknowledgement of the alert; and
in response to not receiving the acknowledgement, determining, from the one or more alert preferences, a next tier alert, and providing the next tier alert via the communication device.

13. The machine-readable storage device of claim 11, wherein the operations further comprise:
causing a user interface to be presented on which the user indicates the one or more alert preferences;
receiving the one or more alert preferences; and
storing the one or more alert preferences to a data storage.

14. The machine-readable storage device of claim 11, wherein the operations further comprise:
in response to the determining that the signature belongs to the non-habitual user, determining whether the signature for the non-habitual user has been detected a threshold number of times; and
in response to the determining that the signature for the non-habitual user has been detected the threshold number of times, converting the signature for the non-habitual user into a signature for a new habitual user, and storing the signature for the new habitual user.

15. The machine-readable storage device of claim 11, wherein the operations further comprise:
estimating a relative strength of the detected speech to background noise; and
providing an indicator of the relative strength of the detected speech to the background noise to the user or a host of the communication session.

16. The machine-readable storage device of claim 11, wherein the providing the alert comprises providing a signal to a transducer to create the alert.

17. A system comprising:
one or more processors; and
a memory storing instructions that, when executed by the one or more processors, causes the one or more processors to perform operations comprising:
receiving, at a communication device of a user, an audio signal captured from a communication session associated with the communication device;
analyzing the audio signal to detect speech;
determining whether the detected speech transgresses a predetermined threshold;
determining that the communication device is in a mute mode;
in response to determining that the communication device is in the mute mode and determining that the detected speech transgresses the predetermined threshold:
comparing a signature determined in the detected speech to one or more known signatures stored in the communication device to determine whether the signature belongs to a habitual user or non-habitual user, and determining an alert to provide based on at least a type of alert that is determined using one or more alert preferences of the user and that is determined based on the comparing indicating whether the signature belongs to the habitual user or the non-habitual user; and providing, via the communication device, the alert determined based on the one or more alert preferences, the provided alert notifying the user that the communication device is in the mute mode.

18. The system of claim 17, wherein the operations further comprise:

monitoring for acknowledgement of the alert; and in response to not receiving the acknowledgement, determining, from the one or more alert preferences, a next tier alert, and providing the next tier alert via the communication device.

19. The system of claim 17, wherein the operations further comprise:

causing a user interface to be presented on which the user indicates the one or more alert preferences;

receiving the one or more alert preferences; and storing the one or more alert preferences to a data storage.

20. The system of claim 17, wherein the operations further comprise:

in response to the determining that the signature belongs to the non-habitual user, determining whether the signature for the non-habitual user has been detected a threshold number of times; and in response to the determining that the signature for the non-habitual user has been detected the threshold number of times, converting the signature for the non-habitual user into a signature for a new habitual user, and storing the signature for the new habitual user.

21. The system of claim 17, wherein the providing the alert comprises providing a signal to a transducer to create the alert.

* * * * *